(12) United States Patent
Lambert

(10) Patent No.: US 6,439,823 B1
(45) Date of Patent: Aug. 27, 2002

(54) VEHICLE RESTRAINT DEVICE

(75) Inventor: Jimmy Lambert, St-Luc (CA)

(73) Assignee: Pro-Qual Inc., Boucherville (CA)

( * ) Notice: Subject to any disclaimer, the term of this patent is extended or adjusted under 35 U.S.C. 154(b) by 0 days.

(21) Appl. No.: 09/794,587

(22) Filed: Feb. 27, 2001

(30) Foreign Application Priority Data

Oct. 26, 2000 (CA) ............................................. 2324516

(51) Int. Cl.$^7$ .............................................. B65G 67/02
(52) U.S. Cl. ......................... 414/401; 14/71.3; 414/396; 414/584; 414/917
(58) Field of Search ................................ 414/396, 401, 414/584, 917; 14/69.5, 71.1, 71.3, 71.7, 73; 188/32

(56) References Cited

U.S. PATENT DOCUMENTS

| | | | |
|---|---|---|---|
| 4,472,099 A | * 9/1984 | Hahn et al. | 414/401 |
| 4,488,325 A | 12/1984 | Bennett et al. | |
| 4,695,216 A | 9/1987 | Erlandsson | |
| 4,735,542 A | * 4/1988 | Fisher et al. | 414/401 |
| 4,759,678 A | * 7/1988 | Haqeman | 414/401 |
| 4,767,254 A | * 8/1988 | Kovach et al | 414/401 |
| 4,830,563 A | 5/1989 | Yeakle | |
| 4,861,217 A | 8/1989 | Erlandsson | |
| 4,946,330 A | 8/1990 | Pedersen et al. | |
| 4,973,213 A | * 11/1990 | Erlandsson | 414/401 |
| 5,071,306 A | 12/1991 | Alexander | |
| 5,120,181 A | 6/1992 | Alexander | |
| 5,297,921 A | * 3/1994 | Springer et al. | 414/401 |
| 5,336,033 A | 8/1994 | Alexander | |
| 5,388,947 A | * 2/1995 | Ancel | 414/401 |
| 5,454,682 A | 10/1995 | Alexander | |
| 5,505,575 A | 4/1996 | Alexander | |
| 5,964,572 A | * 10/1999 | Hahn et al. | 414/401 |
| 6,062,796 A | 5/2000 | Alexander | |
| 6,074,157 A | 6/2000 | Hahn | |
| 6,106,212 A | 8/2000 | Hahn | |
| 6,113,337 A | * 9/2000 | Massey | 414/401 |
| 6,116,839 A | 9/2000 | Bender et al. | |

FOREIGN PATENT DOCUMENTS

| | | | | |
|---|---|---|---|---|
| DE | 3514468 | * 10/1986 | | 414/401 |

\* cited by examiner

*Primary Examiner*—Frank E. Werner
(74) *Attorney, Agent, or Firm*—Darby & Darby

(57) ABSTRACT

A restraint device for restraining a vehicle to a loading dock is disclosed. The restraint device has a pivot member with a hooking member pivotable between an upwards operative position and a downwards inoperative position. The device also has springs for biasing the pivot member in the upwards operative position and an actuator member for bringing back the pivot member from the upwards operative position to the downwards inoperative position. Such a restraint device is securable to a loading dock equipped with a dock leveller which has a platform pivotable between a raised position and a lowered position and a lip. When the platform is in the lowered position, the lip is hanging in a pendant position and engages and presses on the top end of the actuator member thus maintaining the pivot member in the downwards inoperative position. When the platform is pivoted in the raised position in order to proceed with a loading operation of a truck, the lip is caused to move upwards thereby releasing the pressure on the actuator member which causes the pivot member to move in the upwards operative position, therefore hooking the truck to the loading dock.

20 Claims, 8 Drawing Sheets

VEHICLE RESTRAINT DEVICE

FIELD OF THE INVENTION

The present invention relates to restraint device for restraining a vehicle to a fixed structure, and more specifically to a restraint device for restraining a vehicle, such as a truck, to a loading dock.

BACKGROUND OF THE INVENTION

At loading docks, there is an eminent danger that a truck might leave the loading dock while a loading/unloading operation is in process. For instance, the truck driver may think that the loading/unloading process is completed and thus starts to drive away from the loading dock. Such situation creates a real danger for personnel using lift trucks to transport and load merchandises into the truck. Indeed, if an unexpected departure of the truck from the loading dock happens, this could cause the lift truck to fall off the loading dock.

Therefore, a popular way for preventing such accidents from happening is the use of a device that engages the ICC-bar on the rear of the truck to lock the truck next to the loading dock.

Already known in the prior art, there are restraint devices comprising a movable hooking device operated either manually or automatically with an automatic control. Examples of these prior art devices are disclosed in U.S. Pat. No. 5,120,181; 5,454,682; 5,336,033 and 6,062,796. In use, the truck is backed into position in front of the loading dock. Then the operator activates manually or electrically the hooking device in a restraining position in engagement with the truck ICC-bar and locks the hook in this position. When the loading is completed, the hook is manually or electrically released and returned to its stored position.

Other vehicle restraining devices have been proposed in which the actuation of the restraining devices is induced by the contact of the ICC-bar with the device. Examples of these types of devices are shown in U.S. Pat. Nos. 4,695,216 and 6,116,839.

The activation of the device may also be directly actuated by the dock leveller. Such a device is disclosed in U.S. Pat. No. 4,488,325. In this case, movement of the dock leveller's lip actuates an electric circuit by means of a limit switch providing power to a motor in order to move the hook up and down.

While the restraining devices known in the art have resulted in the advancement within the present field, most of these prior art devices generally require motors, pneumatic or hydraulic activating systems. They are indeed very complex, thus expensive to manufacture and difficult to operate.

Therefore, there is still a need for a truck restraint device that is simple to operate, easy to manufacture and does not require motors, pneumatic or hydraulic activating systems to be activated.

SUMMARY OF THE INVENTION

It is therefore an object of the present invention to provide a restraint device for restraining a vehicle to a fixed structure that will overcome these drawbacks.

In accordance with the present invention, that object is achieved with a restraint device which comprises a frame securable to a fixed structure and a pivot member having a first end pivotally secured to the frame and a second end with a hooking member opposite the first end. The pivot member is pivotable on the first end between an upwards operative position and a downwards inoperative position. The device also comprises biasing means for biasing the pivot member in the upwards operative position and means for bringing back the pivot member from the upwards operative position to the downwards inoperative position. The means for bringing back the pivot member from the upwards operative position to the downwards inoperative position comprises an actuator member mounted in the vicinity of the pivot member for vertical sliding movement with respect to the frame, the actuator member having a top end portion opposite a bottom end portion respectively located above and below the first end of the pivot member. The means for bringing back the pivot member further comprises a linking member having a first end pivotally connected to the bottom end portion of the actuator member and a second end opposite the first end pivotally connected to the pivot member at a location between the first and second end thereof. The actuator member is movable along a vertical line between an upwards position obtained when the pivot member is biased in the upwards operative position and a downwards position which causes the pivot member to move in the downwards inoperative position.

The present invention is also directed to a combination of a restraint device as described above with a dock leveller mounted on a loading dock with a low vertical wall and a floor, the restraint device being secured to the low vertical wall under the dock leveller. The dock leveller comprises a platform with a rear edge hinged to the floor of the loading dock and a front edge, the platform being pivotable around the rear edge between a raised position where the front edge is disposed away from the floor and a lowered position where the platform lies on the floor. The dock leveller also comprises a lip having a first edge hinged to the front edge of the platform and a second edge for engaging the top end of the actuator member of the restraint device. The lip is hanging in a pendant position along the vertical wall when the platform is in the lowered position with the second edge engaging and pressing on the top end of the actuator member thus maintaining the pivot member in the downwards inoperative position. When the platform is pivoted in the raised position, the lip is caused to move upwards thereby releasing the pressure on the actuator member which causes the pivot member to move in the upwards operative position.

A restraint device according to the present invention proposes innovative features that makes it simple to operate, easy to manufacture and does not require motors, pneumatic or hydraulic activating systems to activate the device.

BRIEF DESCRIPTION OF THE DRAWINGS

The present invention and its advantages will be more easily understood after reading the following non-restrictive description of a preferred embodiment thereof, made with reference to the following drawings wherein.

DESCRIPTION OF A PREFERRED EMBODIMENT

Figure 1:
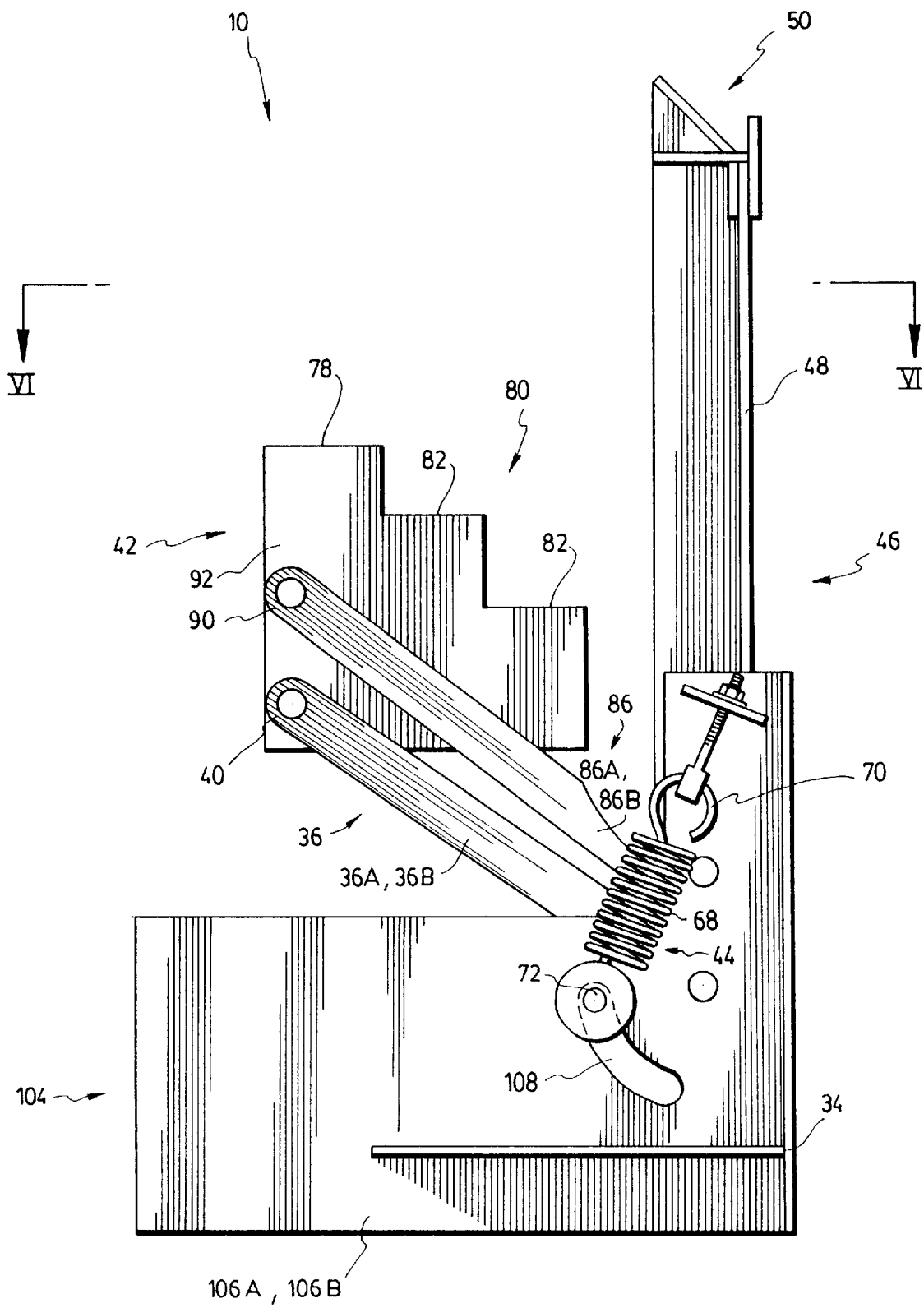
FIG. 1 is a side elevational view of a vehicle restraint device according to a preferred embodiment of the invention.

The present invention is directed to a restraint device (10) for restraining a vehicle (12) to a fixed structure (14). It will be understood that the restraint device (10) according to the present invention may be securable to a variety of fixed structure (14). However, a particular advantageous fixed structure (14) to which the restraint device (10) may be secured to is a loading dock (14).

A common loading dock (14) comprises a floor (16) and a low vertical wall (18) and usually, it is also equipped with a dock leveller (20). As better seen in FIGS. 5 to 7, such a dock leveller (20) generally comprises a platform (22) with a front edge (24) and a rear edge (26), the latter (26) being hinged to the floor (16) of the loading dock (14). Such a construction allows the platform (22) to be pivotable around the rear edge (26) between a raised position, as in FIG. 6, where the front edge (24) is disposed away from the floor (16) and a lowered position, as in FIG. 5, where the platform (22) lies on the floor (16). The dock leveller (20) also comprises a lip (28) having a first (30) and a second (32) edge, the first edge (30) being hinged to the front edge (24) of the platform (22). When the platform (22) is raised, the lip (28) is moved from its pendant position to its extending position in order to rest itself on the rear end of the truck (12), as in FIG. 7.

In accordance with the present invention and as illustrated in FIGS. 1 to 4, a restraint device (10) for restraining a vehicle (12) to the loading dock (14) comprises a frame (34) securable to the loading dock (14). Preferably, the frame (34) is secured solely to the low vertical wall (18) of the loading dock (14) under the dock leveller (20). Nevertheless, a plausible alternative could be to secure the frame (34) of the restraint device (10) solely on the surface area in front of the low vertical wall (18) of the loading dock (14) or the frame (34) may be coupled both to the low vertical wall (18) and the surface area in front of the loading dock (14). In such cases, the restraint device (10) is disposed substantially close to the low vertical wall (18).

The restraint device (10) also comprises a pivot member (36) having a first end (38) pivotally secured to the frame (34) and a second end (40) with a hooking member (42) opposite the first end (38). The pivot member (36) is thus pivotable on the first end (38) between an upwards operative position as in FIG. 1, and a downwards inoperative position, as in FIG. 3.

The restraint device (10) also comprises biasing means (14), which will be described in more details further below for biasing the pivot member (36) in the upwards operative position and means for bringing back (46) the pivot member (36) from the upwards operative position to the downwards inoperative position.

Figure 2:
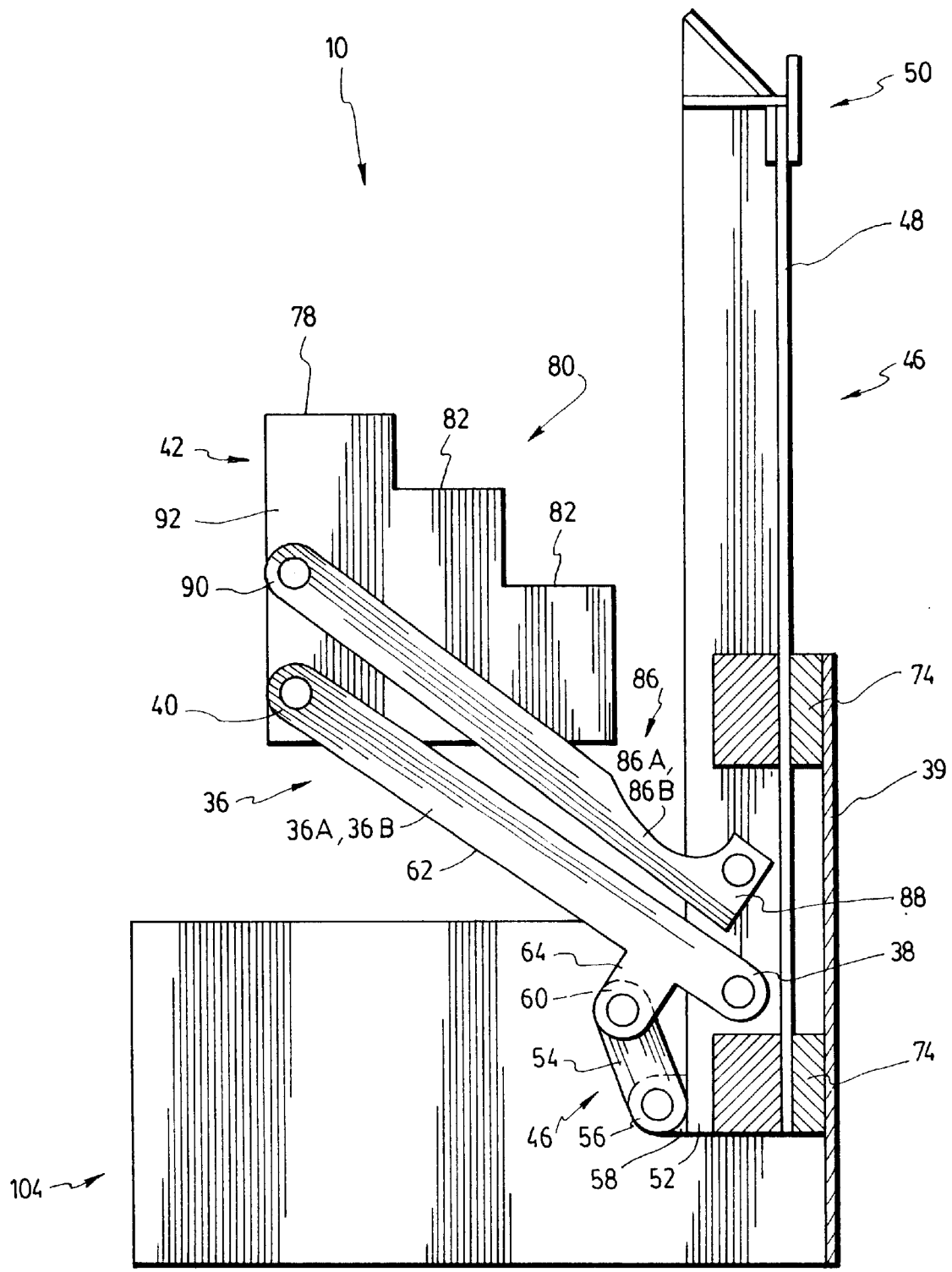
FIG. 2 is a cross-sectional view of the device of FIG. 1, illustrating the device in its operative position.
Figure 3:
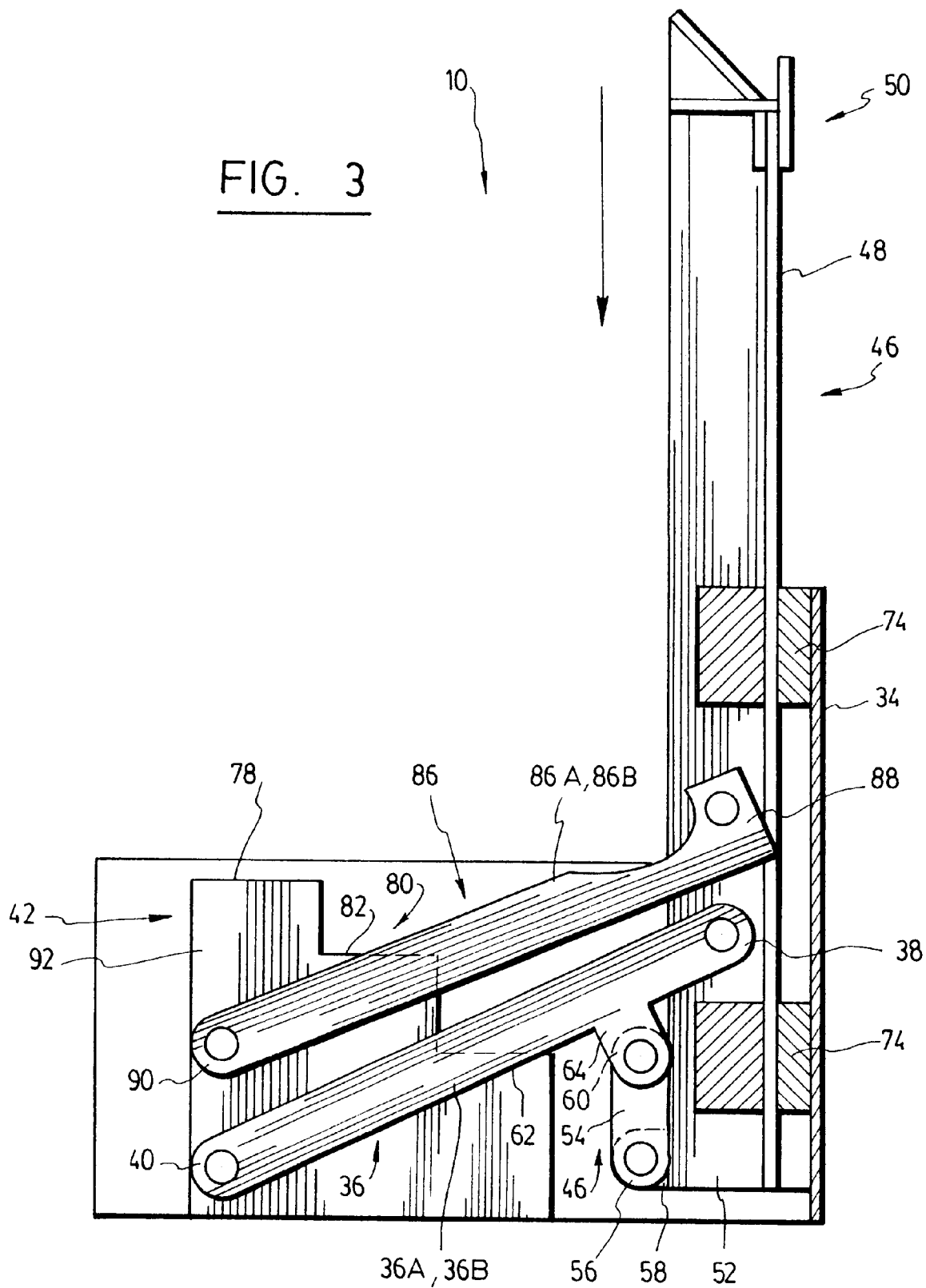
FIG. 3 is cross-sectional view of the device of FIG. 1, illustrating the device in its inoperative position.
Figure 4:
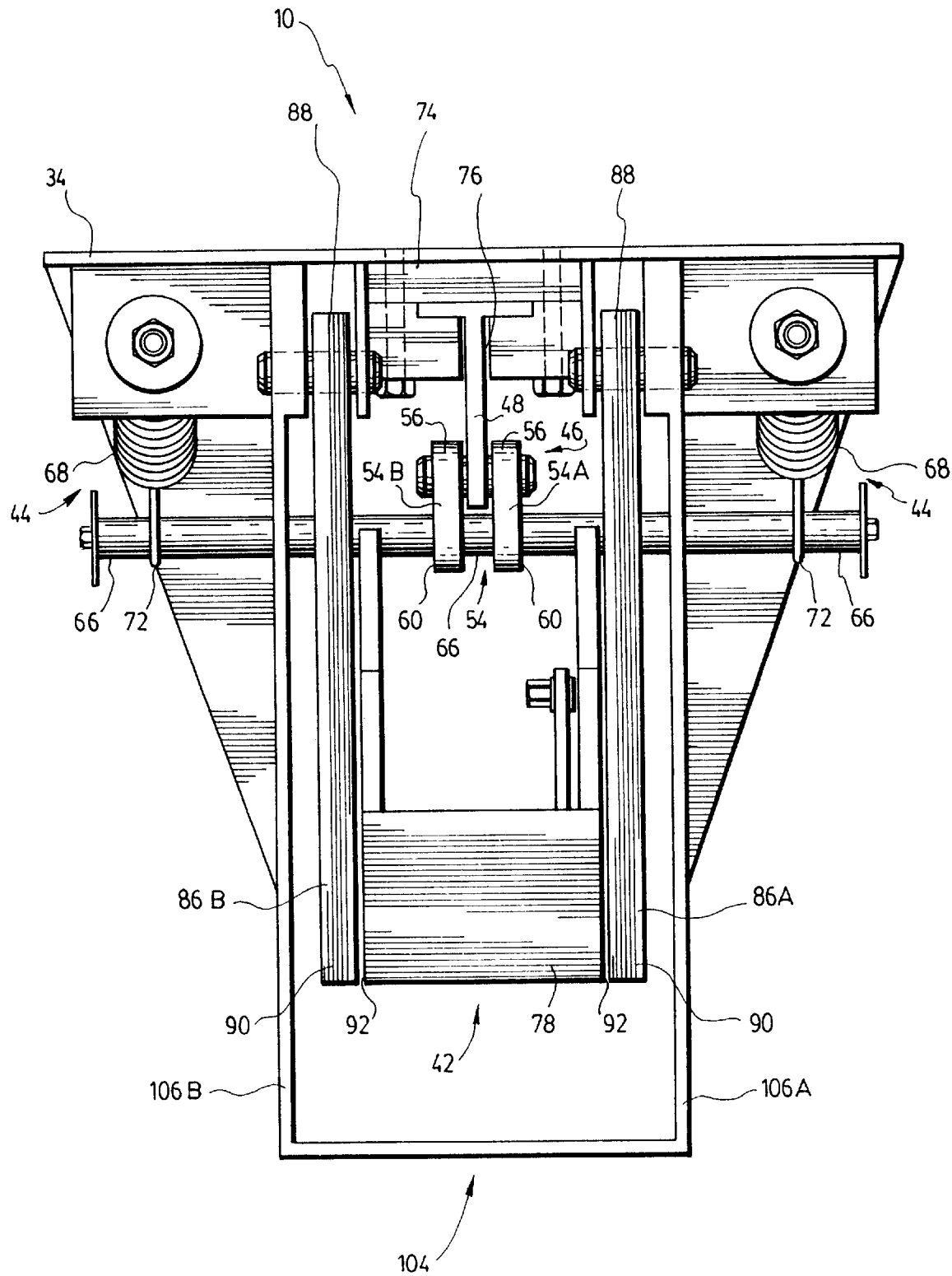
FIG. 4 is a top view of the device of FIG. 1.

As best shown in FIGS. 2 and 3, the means for bringing back (46) the pivot member (36) comprises an actuator member (48) mounted in the vicinity of the pivot member (36) for vertical sliding movement with respect to the frame (34). The actuator member (48), which is preferably an elongated bar (48) with a T-shaped cross-section, as best shown in FIG. 4, has a top end portion (50) opposite a bottom end portion (52) respectively located above and below the first end (38) of the pivot member (36). The means for bringing back (46) the pivot member (36) also comprises a linking member (54), which preferably consists of a first (54a) and a second (54b) linking bar parallel to each other, as best shown in FIG. 4. Each linking bars (54a, 54b) of the linking member (54) has a first end (56) pivotally connected to the bottom end portion (52) of the actuator member (48), preferably a bridge piece (58) extending from the inner side of the bottom end portion (52) of the actuator member (48). In this case, the first end (56) of the linking member (54) is pivotally connected to the bridge piece (58) of the bottom end portion (52) of the actuator member (48). Furthermore, each linking bars (54a, 54b) of the linking member (54) has a second end (60) opposite the first end (56) pivotally connected to the pivot member (36) at a location between the first (38) and second (40) end thereof.

As can be appreciated by viewing FIGS. 2 and 3, the pivot member (36) may consist of a first (36a) and a second (36b) pivot bar parallel to each other (the second pivot bar (36b) is not shown since it is located on the other plane of the Figures). Referring back to FIG. 2, each of the first (36a) and second (36b) pivot bar has an underside (62) and a flange (64) extending therefrom. In such a case, the above mentioned location to which the second end (60) of the linking member (54) is coupled to the pivot member (36) is located on the flanges (64). Even though the use of flanges (64) is a preferable feature, it will be understood that each linking bars (54a, 54b) of the linking member (54) may be pivotally connected directly on the pivot member (36) between the first (38) and second end (40) thereof. In such a case, the pivot member (36) does not comprises a flange (64), and nevertheless, a restraint device (10) of the present invention would still keep its restraint capabilities.

As better seen in FIG. 4, the restraint device (10) advantageously comprises a transversal swivel rod (66) for pivotally connecting the second end (60) of each linking bar (54a, 54b) of the linking member (54) to the pivot member (36). In order to achieve that coupling, the swivel rod (66) runs through the flange (64) of the first (36a) and the second (36b) pivot bars and through the second end (60) of each linking bar (54a, 54b).

Referring now to FIGS. 1 and 4, the biasing means (44) preferably comprises at least one coil spring (68), but most preferably two coil springs. Each spring (68) has a first end (70) secured to the frame (34) above the first end (35) of the pivot member (36) and a second end (72) opposite the first end (70) pivotally connected to the transversal swivel rod (66) so that the second end (72) of each coil spring (68) and the second end (60) of the linking member (54) are rotatable around a same pivot axis.

With this construction, the biasing means (44) in conjunction with the means for bringing back (46) the pivot member (36) allows therefore the actuator member (48) to be movable along a vertical line between an upwards position obtained when the pivot member (36) is biased in the upwards operative position, as in FIG. 1 and a downwards position which causes the pivot member (36) to move in the downwards inoperative position, as in FIG. 3.

Viewing FIG. 4 in conjunction with FIGS. 2 and 3, the restraint device (10) may advantageously comprises a guide member (34) with a T-shaped groove (76) for slidably receiving and guiding the elongated bar (48) of the actuator member (48) during its vertical sliding movement. Such a guide member (74) may be securable to the frame (34) of the restraint device (10) or to the fixed structure (14), such as the low vertical wall (18) of the loading dock (14). As can be appreciated, in the preferred embodiment illustrated, the restraint device (10) comprises two guide members (74). Nevertheless, only one guide member (74) may suffice.

Referring back to FIGS. 2 and 3, the hooking member (42) preferably comprises a block (78) mounted in rotation between the first (36a) and second (36b) pivot bar. The block (78) has a stair-shaped face (80) with at least one step (82) for hooking the vehicle (12), preferably by engaging the ICC-bar (84) of a truck (12) (see FIG. 7). The restraint device (10) further comprises a stabilizing assembly (86) for stabilizing the hooking member (42) or the block (78) in a hooking position while the pivot member (36) is pivotably moved between its upwards operative position and its downwards inoperative position.

As can be appreciated and illustrated in most of the Figures, the stabilizing assembly (86) comprises a first arm (86a) and a second (86b) arm parallel to each other and respectively disposed over the first (36a) and the second (36b) pivot bars. Each arms (86a, 86b) has a first end (88) pivotally secured to the frame (34) and a second arm (90) pivotally secured respectively to a lateral side (92) of the block (78).

Figure 5:
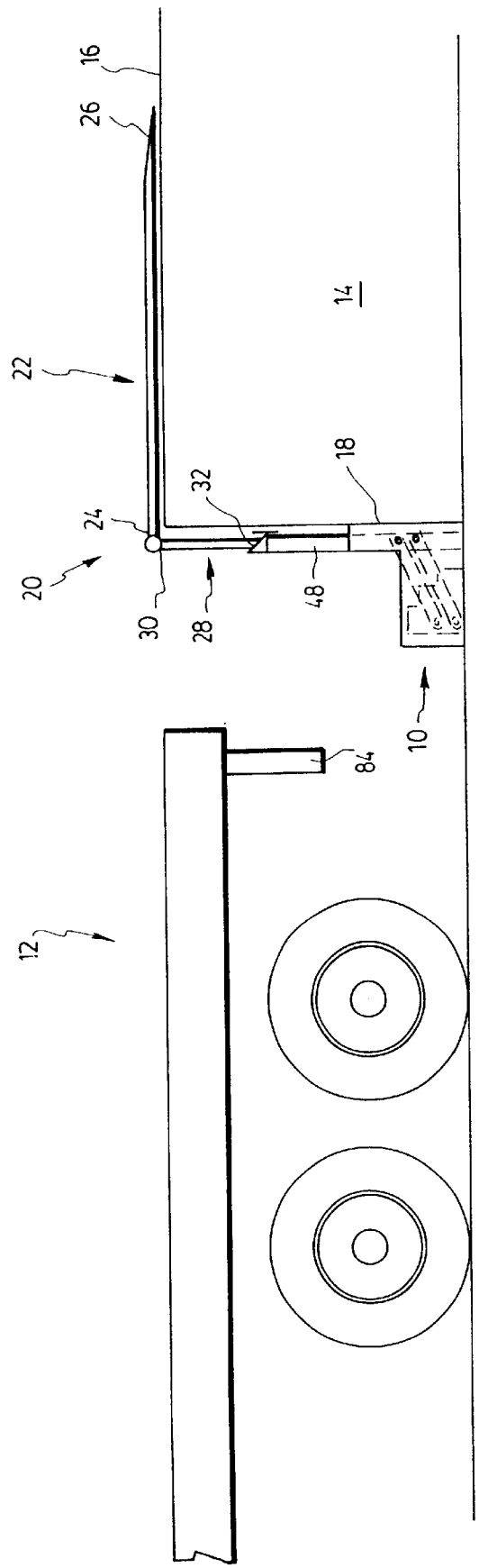
FIGS. 5, 6 and 7 are schematic side views illustrating the engagement process of a truck to a loading dock incorporating a device of the invention.
Figure 6:
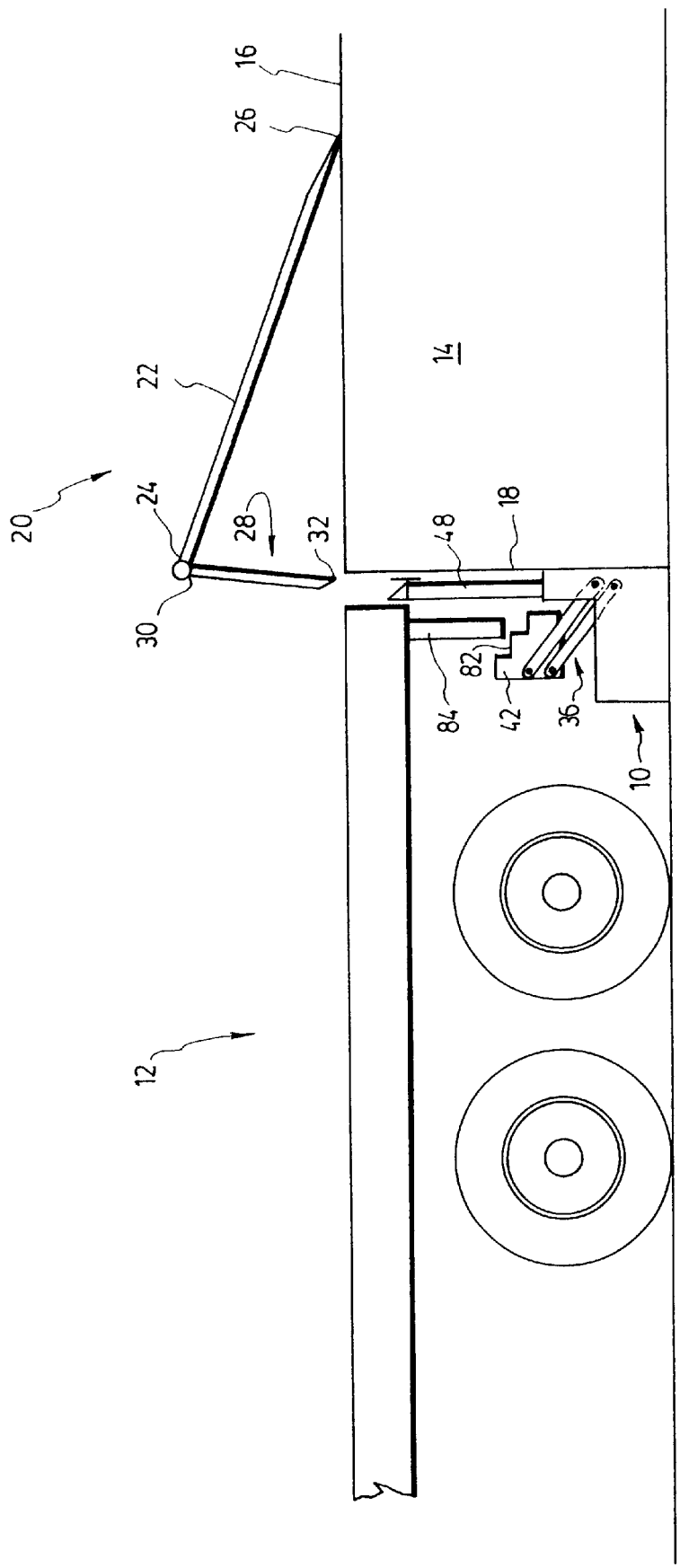
Figure 7:
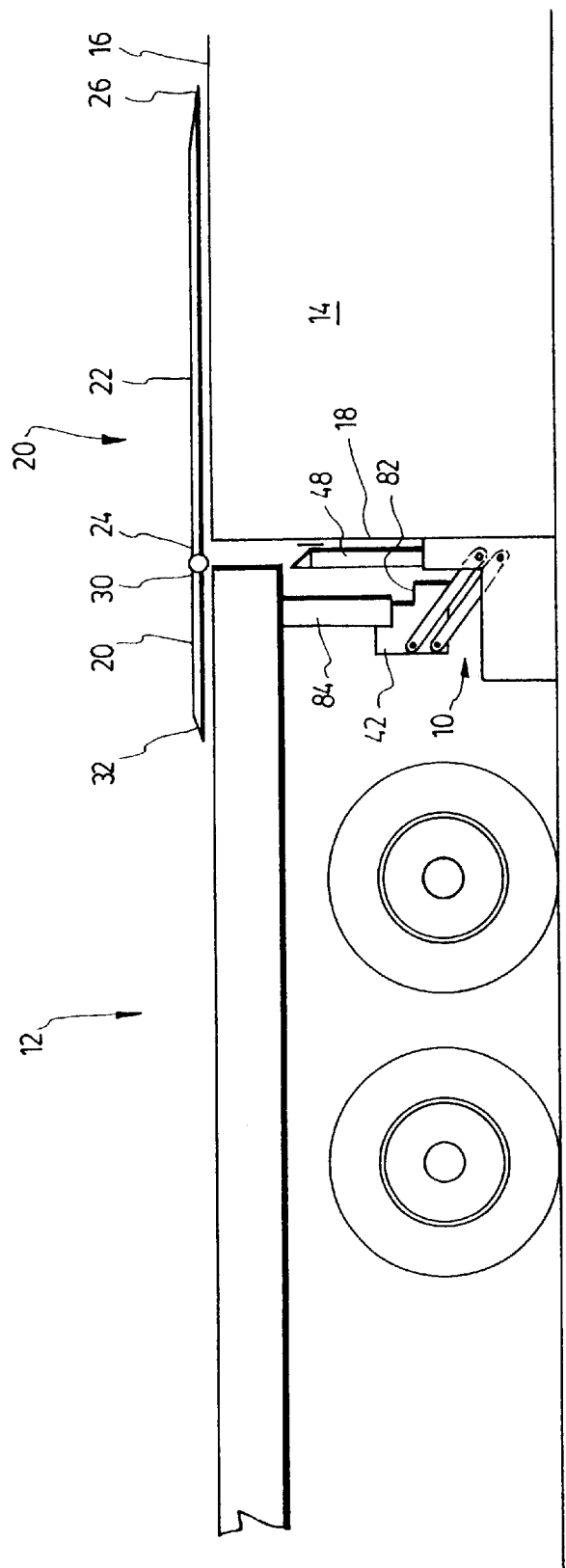

FIGS. 5 to 7 illustrate the restraining operation of a truck (12) to the loading dock (14) when a restraint device (10) according to the present invention is used. Thus, as the truck (12) backs toward the loading dock (14) for the loading operation, the rear end of the truck (12) will usually engage bumpers (not shown), which are generally mounted on either side on the low vertical wall (18) of the loading dock (14). Therefore, the engagement of the truck (12) with the bumpers will space the truck (12) from the loading dock (14) and the restraint device (10). At this particular time, the platform (22) is in the lowered position and the lip (28) is hanging in a pendant position along the low vertical wall (18) with its second edge (32) engaging and pressing on the top end (50) of the actuator member (48) thus maintaining the pivot member (36) with the hooking member (42) in the downwards inoperative position. Desirably, the top end (50) of the actuator member (48) has a receptacle-like end adapted to receive any type of lips (28).

Then, an operator will activate the necessary control to pivot the platform (22) in the raised position. Consequently, the lip (28) is caused to move upwards thereby releasing the pressure on the actuator member (42) which causes the pivot member (36) to move in the upwards operative position (see FIG. 6). As illustrated in FIG. 7, the truck (12) is hooked to the loading dock (14) and restrained from moving forward by the intermediary of the engagement of the hooking member (42) or the block (42) with the ICC-bar (84) of the truck (12). The plurality of steps (82) disposed on the stair-shaped face (80) of the block (78) will allow numerous ways to provide engagement with the ICC-bar (84) even if the ICC-bar (84) is mounted further forward on the truck (12) or has a different shape or size.

Figure 8:
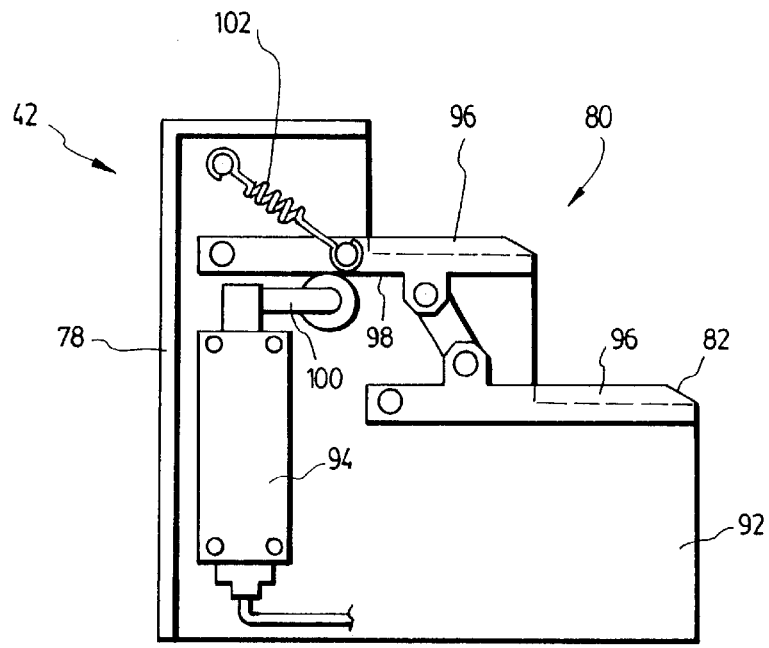
FIG. 8 is a cross-sectional side view of the hooking member according to a preferred embodiment of the invention, illustrating a sensor mechanism.
Figure 9:
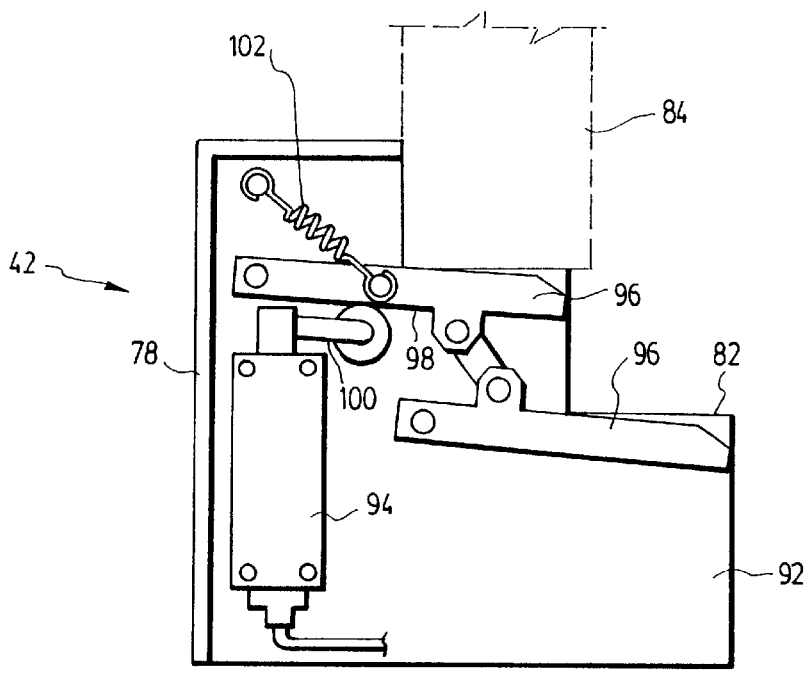
FIG. 9 is a cross-sectional side view of the hooking member engaging the ICC-bar of a truck, and activating the sensor mechanism.

Advantageously, the position of the mechanism and contact of the hooking member (42) with the ICC-bar (84) may be sensed by limit switches (94) disposed in the hooking member (42), as illustrated in FIGS. 8 and 9. In this regard, a sensor strip (96) is pivotally disposed on the upper surface of each step (82) of the hooking member (42). The sensor strip (96) has an underside (98) that is in direct abutment with the arm (100) of a limit switch (94). A spring (102) pivotally coupled to the sensor strip (96) biases the sensor strip (96) upwardly so that the limit switch (94) is not actuated.

When the ICC-bar (84) comes in contact and presses on the sensor strip (96), the latter (96) moves downwardly so to pull down the arm (100) of the limit switch (94) thereby activating a signaling device. Such a signaling device may be one or more lights mounted on the vicinity of the loading dock (14). The light indicates to the operator on the loading dock (14) and/or to the truck driver, that a loading operation is in progress and that the hooking member (42) is in engagement with the ICC-bar (84) of the truck (12).

After the loading operation has been completed, the operator will raise the platform (22) and movement of the platform (22) will cause lip (28) to move to its pendant position. Movement of lip (28) toward its pendant position will cause the second edge (32) of the lip (28) to engage and press on the top end (50) of the actuator member (48) thus moving the pivot member (36) with the hooking member (42) in the downwards inoperative position. Consequently, the disengagement of the ICC-bar (84) with the hooking member (42) will cause an upward movement of the sensor strip (96) which will pull up the arm (100) of the limit switch (94), thereby activating the signaling device in order to indicate to the operator on the loading dock (14) and/or to the truck driver, that the loading operation is done and that the hooking member (42) is disengaged from the ICC-bar (84) of the truck (12).

Most of the elements or parts of the restraint device (10) according to the present invention are preferably made of steel, or most preferably of hot galvanized steel to better resist to corrosion. In addition, the swivel rod (66) is preferably made of chrome whereas the guide members (74) are preferably made of Teflon so as to minimize their use and maintenance.

The restraint device (10) of the present invention may also be equipped with a box (104) as shown in FIGS. 1 and 4 with lateral sides (106a, 106b) to protect the mechanism against clash damage. Each lateral side (106a, 106b) is therefore provided with a groove (108) for allowing free movement of the swivel rod (66). Furthermore, the box (104) may be slightly elevated off the surface area in front of the loading dock (14) so that water and debris would be swept underneath the restraint device (10).

Although a preferred embodiment of the present invention has been described in detail herein and illustrated in the accompanying drawings, it is to be understood that the invention is not limited to this precise embodiment and that various changes and modifications may be effected therein without departing from the scope or spirit of the present invention.

What is claimed is:

1. A restraint device for restraining a vehicle to a fixed structure, the device comprising:
    a frame securable to the fixed structure;
    a pivot member having a first end pivotally secured to the frame and a second end with a hooking member opposite the first end, the pivot member being pivotable on said first end between an upwards operative position and a downwards inoperative position;
    biasing means for biasing the pivot member in the upwards operative position;
    means for bringing back the pivot member from the upwards operative position to the downwards inoperative position;
    the means for bringing back the pivot member from the upwards operative position to the downwards inoperative position comprising:
        an actuator member mounted in the vicinity of the pivot member for vertical sliding movement with respect to the frame, the actuator member having a top end portion opposite a bottom end portion respectively located above and below the first end of the pivot member, and a linking member having a first end pivotally connected to the bottom end portion of the actuator member and a second end opposite the first end pivotally connected to the pivot member at a location between the first and second end thereof;

the actuator member being movable along a vertical line between an upwards position obtained when the pivot member is biased in the upwards operative position and a downwards position which causes the pivot member to move in the downwards inoperative position.

2. A restraint device according to claim 1, comprising a transversal swivel rod for pivotally connecting the second end of the linking member to the pivot member.

3. A restraint device according to claim 2, wherein the biasing means comprises at least one coil spring having a first end secured to the frame above the first end of the pivot member and a second end opposite the first end pivotally connected to the transversal swivel rod so that the second end of the at least one coil spring and the second end of the linking member are rotatable around a same pivot axis.

4. A restraint device according to claim 1, wherein the actuator member is an elongated bar with a T-shaped cross-section.

5. A restraint device according to claim 4, comprising a guide member securable to the frame of the device or to the fixed structure, the guide member having a T-shaped groove for slidably receiving and guiding the elongated bar during its vertical sliding movement.

6. A restraint device according to claim 5, wherein the pivot member consists of a first and a second pivot bar parallel to each other.

7. A restraint device according to claim 6, wherein each of the first and second pivot bar has an underside and a flange extending therefrom, the swivel rod running through said flanges.

8. A restraint device according to claim 7, wherein the linking member consists of a first and a second linking bar parallel to each other.

9. A restraint device according to claim 8, wherein the hooking member comprises a block mounted in rotation between the first and second pivot bar, the block having a stair-shaped face with at least one step for hooking the vehicle, the restraint device further comprising a stabilizing assembly for stabilizing the hooking member in a hooking position while the pivot member is pivotably moved between its upwards operative position and its downwards inoperative position.

10. A restraint device according to claim 9, wherein the stabilizing assembly comprises a first arm and a second arm parallel to each other and respectively disposed over the first and the second pivot bars, each arms having a first end pivotally secured to the frame and a second arm pivotally secured respectively to a lateral side of the block.

11. A combination of a restraint device according to claim 1 with a dock leveller mounted on a loading dock with a low vertical wall and a floor, the restraint device being secured to the low vertical wall under the dock leveller, and the dock leveller comprising:

a platform with a rear edge hinged to the floor of the loading dock and a front edge, the platform being pivotable around the rear edge between a raised position where the front edge is disposed away from the floor and a lowered position where the platform lies on the floor; and a lip having a first edge hinged to the front edge of the platform and a second edge for engaging the top end of the actuator member of the restraint device, the lip hanging in a pendant position along the vertical wall when the platform is in the lowered position with said second edge engaging and pressing on the top end of the actuator member thus maintaining the pivot member in the downwards inoperative position, and when the platform is pivoted in the raised position, the lip is caused to move upwards thereby releasing the pressure on the actuator member which causes the pivot member to move in the upwards operative position.

12. A combination according to claim 11, comprising a transversal swivel rod for pivotally connecting the second end of the linking member to the pivot member.

13. A combination according to claim 12, wherein the biasing means comprises at least one coil spring having a first end secured to the frame above the first end of the pivot member and a second end opposite the first end pivotally connected to the transversal swivel rod so that the second end of the at least one coil spring and the second end of the linking member are rotatable around a same pivot axis.

14. A combination according to claim 11, wherein the actuator member is an elongated bar with a T-shaped cross-section.

15. A combination according to claim 14, comprising a guide member securable to the frame of the device or to the fixed structure, the guide member having a T-shaped groove for slidably receiving and guiding the elongated bar during its vertical sliding movement.

16. A combination according to claim 15, wherein the pivot member consist of a first and a second pivot bar parallel to each other.

17. A combination according to claim 16, wherein each of the first and second pivot bar has an underside and a flange extending therefrom, the swivel rod running through said flanges.

18. A combination according to claim 17, wherein the linking member consist of a first and a second linking bar parallel to each other.

19. A combination according to claim 18, wherein the hooking member comprises a block mounted in rotation between the first and second pivot bar, the block having a stair-shaped face with at least one step for hooking the vehicle, the restraint device further comprising a stabilizing assembly for stabilizing the hooking member in a hooking position while the pivot member is pivotably moved between its upwards operative position and its downwards inoperative position.

20. A combination according to claim 19, wherein the stabilizing assembly comprises a first arm and a second arm parallel to each other and respectively disposed over the first and the second pivot bars, each arms having a first end pivotally secured to the frame and a second arm pivotally secured respectively to a lateral side of the block.

* * * * *